US00RE38035E

(19) United States
(12) Reissued Patent
Kahn

(10) Patent Number: US RE38,035 E
(45) Date of Reissued Patent: Mar. 18, 2003

(54) TOOL BELT TOOL TOTE

(76) Inventor: Peter P. Kahn, 381 S. Country Rd., Brookhaven Hamlet, NY (US) 11719

(21) Appl. No.: 09/756,732

(22) Filed: Jan. 10, 2001

Related U.S. Patent Documents

Reissue of:
(64) Patent No.: 6,062,449
Issued: May 16, 2000
Appl. No.: 09/283,221
Filed: Apr. 1, 1999

(51) Int. Cl.[7] ..... A45F 5/00
(52) U.S. Cl. ..... 224/268; 224/666; 224/904
(58) Field of Search ..... 224/269, 268, 224/904, 660, 663, 666, 671, 676, 677, 678, 255, 266; D13/215

(56) References Cited

U.S. PATENT DOCUMENTS 4,358,036 A * 11/1982 Maltais ..... 224/255 X
4,433,801 A * 2/1984 Swinney ..... 224/268 X
4,883,290 A * 11/1989 Landa ..... 224/677 X
5,564,610 A * 10/1996 Barron ..... 224/268
5,664,712 A * 9/1997 Smrt ..... 224/269 X
6,325,577 B1 * 12/2001 Anderson ..... 224/268 X

* cited by examiner

*Primary Examiner*—Renee Luebke
(74) *Attorney, Agent, or Firm*—Peter A. Borsari

(57) ABSTRACT

A tool-toting device for carrying and retaining a hand tool comprising a clip, a swivel element and a U-shaped hook, the clip being capable of attachment to a belt, such as a tool belt. The swivel element is swivelably connected to the clip by conventional means, such as a semi-tubular rivet such that it freely swivels about a 360° axis, while the U-shaped hook is rotatably connected to the swivel element by means of a jam nut-acorn nut arrangement such that it is capable of rotating about a 360° axis. In this manner, a tool hanging from the U-shaped hook will swivel about the 360° axis, thereby maintaining its center of gravity as the user moves about a construction area. The user can re-position the hook for comfort and accessibility simply by rotating the hook about its axis.

17 Claims, 4 Drawing Sheets

TOOL BELT TOOL TOTE

Matter enclosed in heavy brackets [ ] appears in the original patent but forms no part of this reissue specification; matter printed in italics indicates the additions made by reissue.

FIELD OF INVENTION

The present invention relates to the field of carrying or toting devices, and specifically to a tool belt attachment that allows a user to carry or tote a desired tool, such as a cordless drill, hammer, gas drive nail gun, stapler, or the like, that will be used intermittently, thereby freeing the user's hands when he is not using the tool. More particularly, the present invention is an improvement of the Tool Belt Tool Tote described in U.S. Pat. No. 5,743,451 to the same inventor. The improved tool belt tote comprises a belt clip for attachment to a standard belt or workman's tool-belt, a terminal swivel element and a swivel hook element, the improvement being in the manner in which the swivel hook element is connected to the terminal swivel element. In use, a tool supported by the swivel hook element is able to pivot freely from the terminal swivel element in order to maintain its center of gravity such that the tool will remain securely attached to the tool tote and can be rotated 180° from center in either direction thereby remaining easily positionable and accessible to the user.

BACKGROUND OF THE INVENTION

The prior art is replete with a variety of tool belts which are provided to retain one or more desired tools. Exemplary tool belts are provided with cloth, leather or steel loops which depend from the belt and which serve as tool retainers. Although useful to an extent, tool belts present certain inherent limitation. For example, because cloth is not necessarily a rigid structure, cloth loops may close when not in use, making it difficult for the user to replace the tool into the loop with one hand. Moreover, a loop may tightly constrict about a tool handle as the tool settles into position, thereby making it difficult to remove the tool when it is needed. Similar problems arise with the use of the more rigid leather type loops.

Although there exists tool belts that are equipped with steel hammer holders, these supports are non-adjustable. More significantly, the use of loops for retaining work tools requires that the tool being retained therein remains in a fairly static position; in other words, the tool fails to swivel as the user moves about. This situation can prove dangerous, as for example when the tool is a heavy instrument such as a hammer or has sharp edges, in that the tool may slip out of its loop when the user is climbing a ladder and the hammer head approaches an inverted position, thereby endangering personnel and materials located below.

Despite the teachings of the prior art, a need still exists for a tool toting device which may be attached to a belt or a tool belt that facilitates carrying a desired tool in a safe and convenient manner which frees the user's hands. Such a device should be sufficiently rigid so that the user can store a tool onto it with one hand. Such a device also should permit swiveling of a carried tool so that the tool's center of gravity is not shifted to a dangerous position but rather maintains the tool within the safe control of the user even while climbing about in a work space. Further, such a device should enable the user to easily re-position the tool for comfort, safety and greater accessibility. Finally, such a device should be relatively simple and inexpensive to manufacture but be of durable construction.

SUMMARY OF THE INVENTION

Accordingly, it is an object of the present invention to provide a tool-belt tote device in which the aforementioned problems can be overcome comprising a clip removably detachable to a belt from which depends a swivelable hook element for retaining a desired tool.

It is a further object of the present invention to provide a tool-belt tote device for retaining a tool which can be removed single-handedly therefrom.

It is another object of the present invention to provide a tool-belt tote device which permits the user to adjust the position of a retained tool to a position which is comfortable and easily accessible from both the left-hand and right-hand side of the user.

It is still another object of the present invention to provide a tool-belt tote device which is economical to manufacture, durable in construction and effective in operation.

Additional objects, advantages and novel features of the present invention will be set forth in part in the description which follows and in part will become apparent to those skilled in the art upon examination of the following specification or may be learned by practice of the invention. To the accomplishment of the above-related objects, this invention may be embodied in the forms illustrated in the accompanying drawings, attention being called to the fact, however, that the drawings merely are illustrative, and that changes may be made in the specific construction illustrated and described within the scope of the appended claims.

BRIEF DESCRIPTION OF THE DRAWINGS

The present invention will be better understood with reference to the appended drawing sheets, wherein.

DETAILED DESCRIPTION

Figure 1:
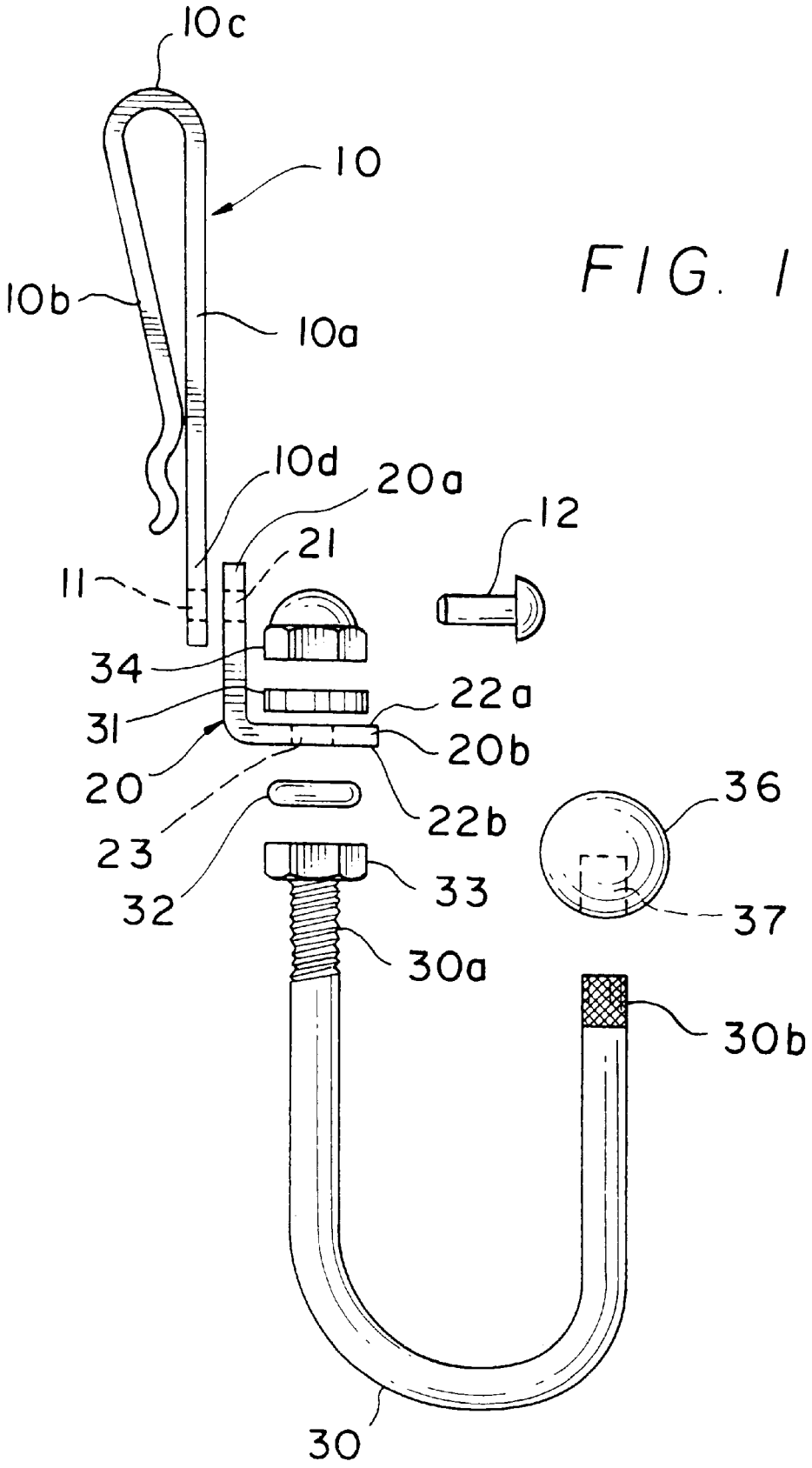
FIG. 1 is an exploded side view of the tool belt tool tote of the present invention.
Figure 1A:
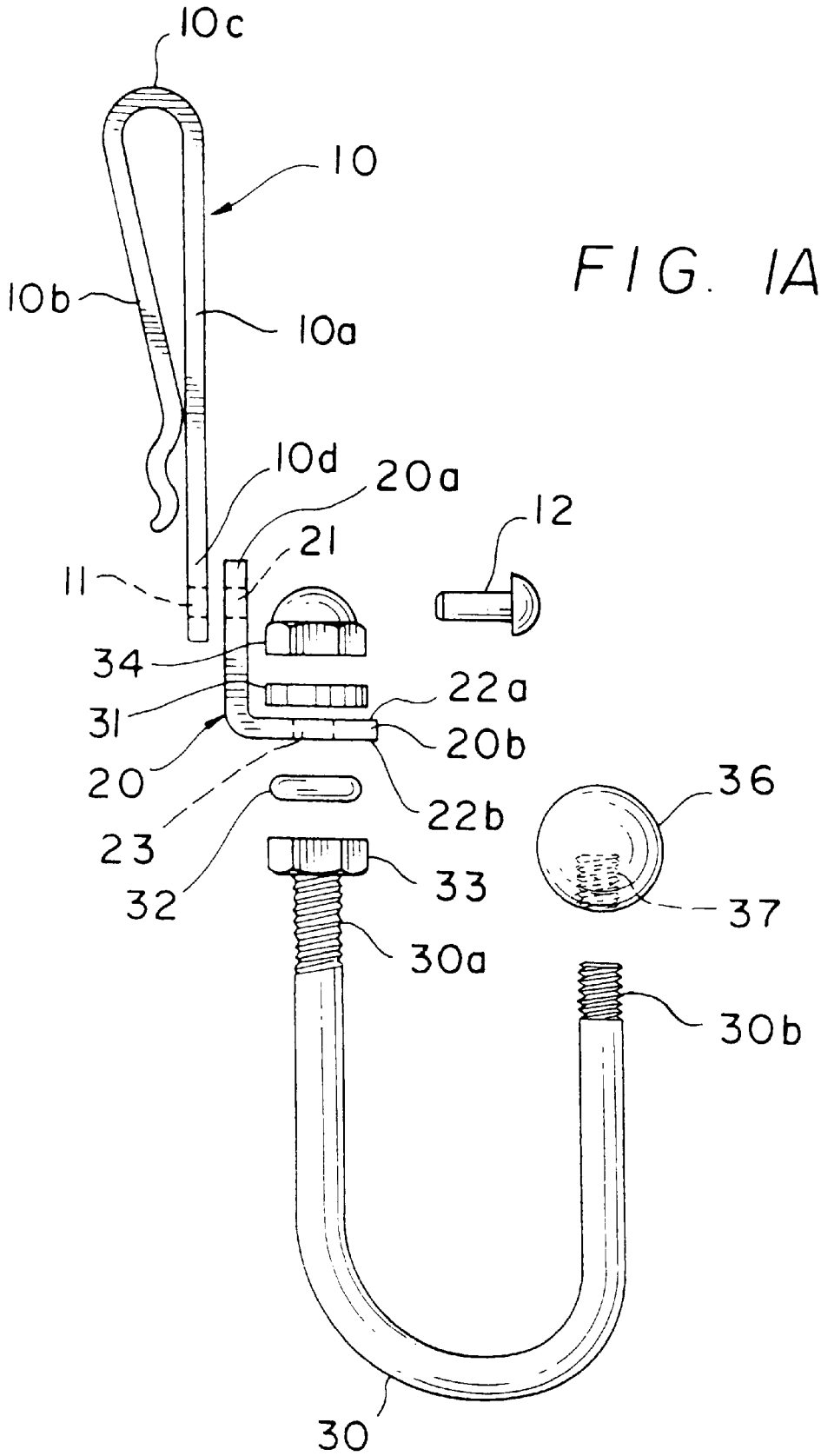
FIG. 1A is an exploded view of an alternate embodiment of the distal end of the hook.
Figure 2:
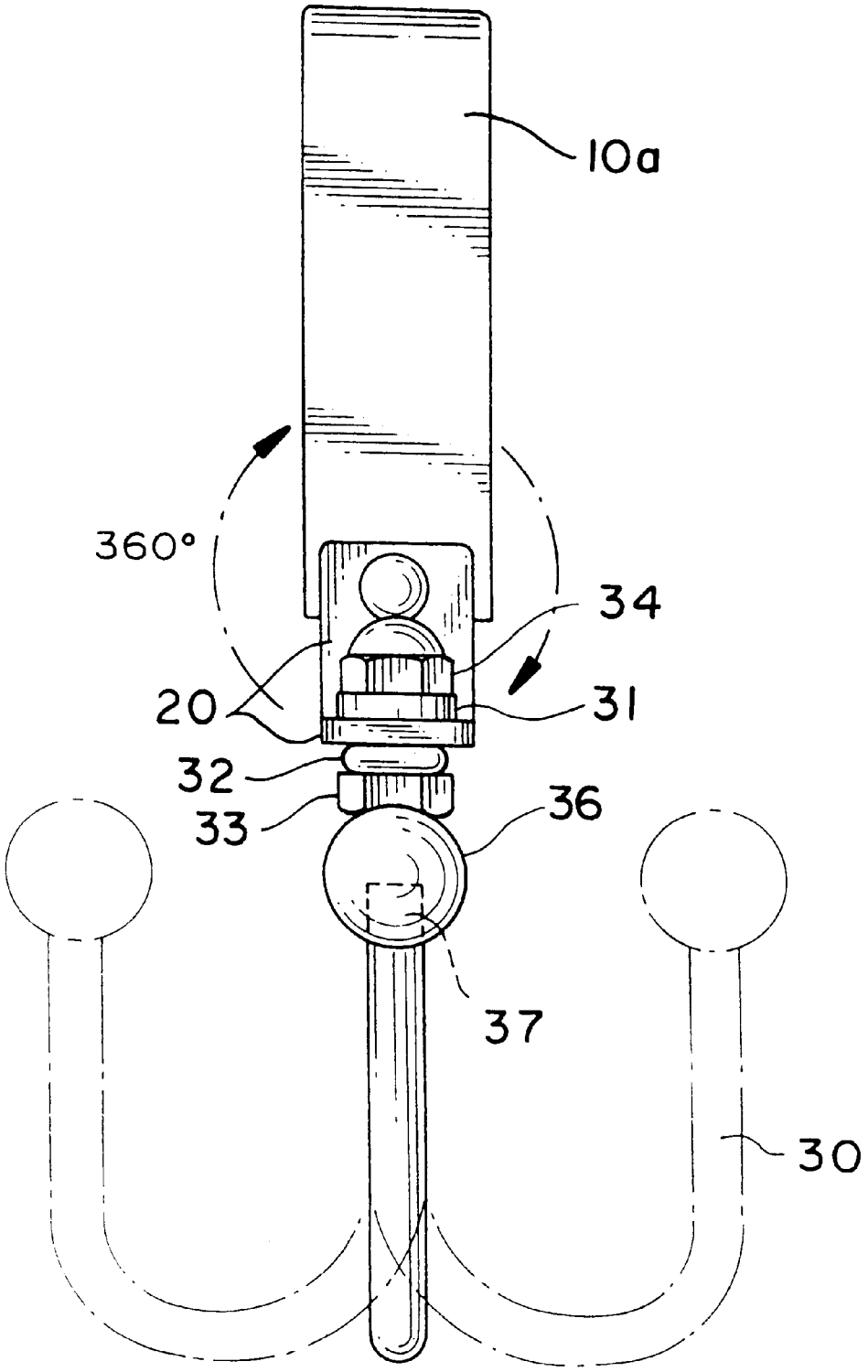
FIG. 2 is a front view of the tool belt tool tote of the present invention.
Figure 3:
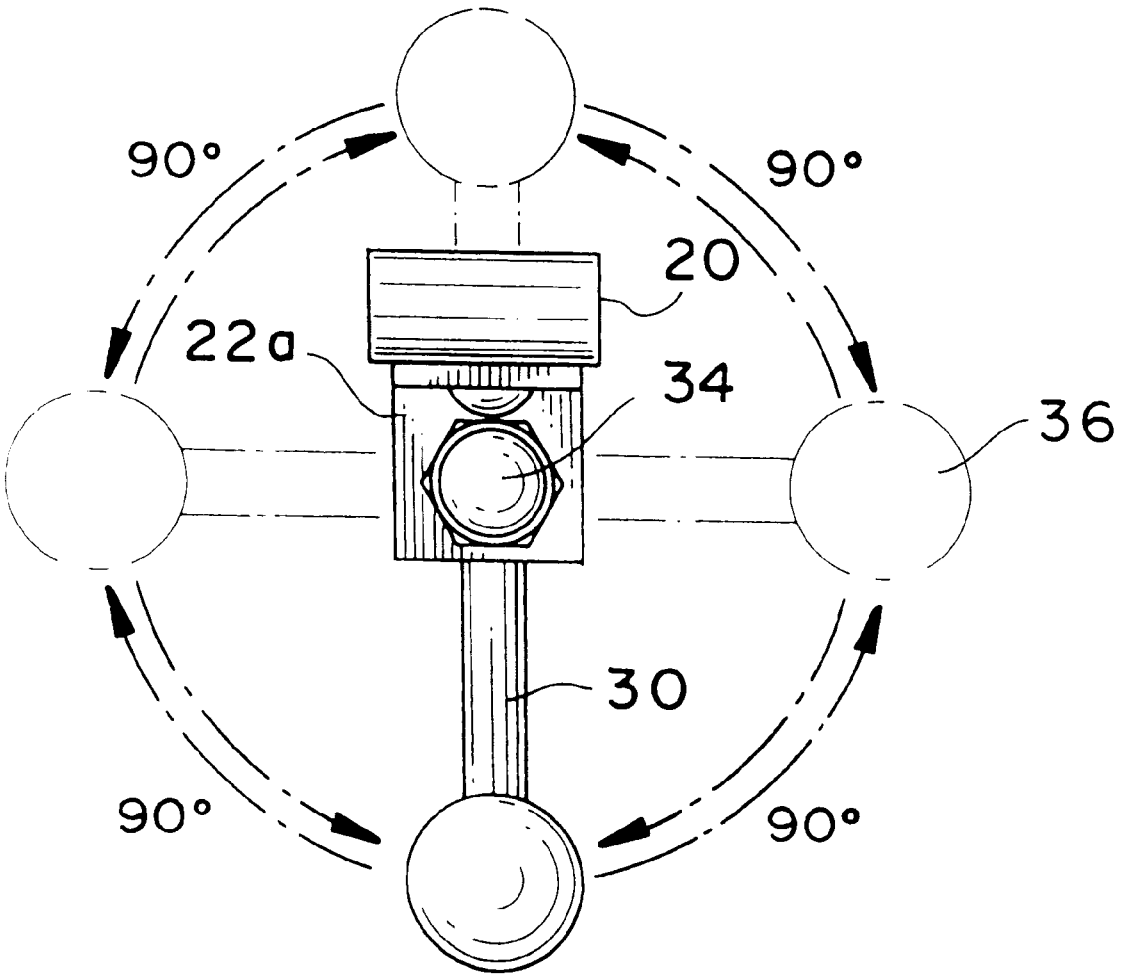
FIG. 3 is a top view of the tool belt tool tote of the present invention.

The present invention relates to a device for supporting and carrying a variety of tools on a belt, and in particular on a standard tool-belt. Referring to the figures, the device comprises a clip 10, a swivel element 20 and a U-shaped hook element 30. Clip 10 is in the form of a C-shaped clip having a front face 10a, a rear face 10b and a rounded top end 10c; the front face 10a terminating into a connecting end 10d having an aperture 11 disposed therein. Swivel element 20 is in the form of an L-shape, having a first end 20a and a second end 20b. First end 20a is provided with an aperture 21 corresponding in size to aperture 11 such that the apertures can be aligned and joined by introducing a suitable fastening means 12 through said apertures 11 and 21. Suitable fastening means include, for example, the use of a semi-tubular rivet of sufficient diameter to be inserted through apertures 11 and 21, a conventional bolt and nut arrangement or providing internally threaded apertures which can be connected by an externally threaded bolt. Preferably, the fastening means is a simple semi-tubular rivet 12 having a diameter slightly less than the diameter of apertures 11 and 21, thereby providing the swivel element 20 with a 260° rotation about the axis of the rivet. The second end 20b of swivel element 20 has a top surface 22a, a bottom surface 22b and is provided with an aperture 23 for attaching the U-shaped hook 30 thereto. U-shaped hook 30 comprises a first externally threaded end 30a and a second distal end 30b. The coupling means to securely attach the U-shaped hook 30 to the swivel element 20 comprise an O-ring 31, an O-ring or nylon washer 32, an internally threaded jam nut 33 and an acorn nut 34. To join the U-shaped hook 30 to the swivel element 20, jam nut 33 threadedly engages first end 30a of hook 30, the O-ring 32 is disposed onto the jam nut and the first end 30a is introduced into the aperture 23 such that the first end 30a extends through the top surface 22a of the swivel element 20. The nylon washer is disposed over the first end and a locking acorn nut 34 is used to threadedly engage the first end. Preferably, glue or similar adhesive is applied to the interior surface of jam nut 33 such that it is permanently affixed to the lower portion of the threaded first end 30a. In this manner, the hook 30 is securely attached to the swivel element, but is capable of rotating 360° about its axis without becoming loose due to the frictional nature of the O-ring and nylon washer arrangement, thereby allowing the hook to be positioned for comfort. The hook material may be fabricated from hard or soft metals, metal alloys, hard plastics, flexible plastics or combinations thereof. Preferably, the hook 30 is composed of a soft aluminum metal or alloy thereof such that it is flexible and will bend under minimum pressure but is capable of being re-bent to its original shape. Capping means in the form of a ball, knob or similar device 36 may be inserted over the second end 30b of the hook. The incorporation of the ball protects the user from contacting the second end 30b of the hook with his hand and prevents undue wear to the device. Preferably, the lower end 30b is knurled and the ball 36 is provided with a recess 37 such that the ball can be pressed onto the second end of the hook. Alternatively, the second end 30b of the hook may be externally threaded and the recess 37 is provided with internally mating threads such that the ball 36 may be readily screwed onto the second end 30b of the hook 30.

The clip 10 can be fastened to a belt, tool belt, tool holster or any other conventional means for carrying tools, simply by inserting the belt, tool belt etc. into the space between the front face 10a and the rear face 10b such that the front face faces outwardly. The clip 10 may be composed of any suitable material conventional to the art, including, for example, hard or soft metals or metal alloys, hard plastics, flexible plastics and combinations thereof, for example, a metal clip having an outer plastic covering. A variety of tools can be hung from the hook 30; once a tool is suspended from the hook 30, the hook automatically adjusts for the tool's center of gravity by the swivelling action of the swivel element 20 about the axis of fastening means 12. In this manner, the tool not only is prevented from falling off of the hook, but also is readily accessible to the tool belt wearer. The tool belt wearer is able to re-position a tool supported by hook 30 simply by rotating the hook along the longitudinal axis of its first end.

While particular embodiments of the invention have been described, it will be understood, of course, that the invention is not limited thereto, and that many obvious modifications and variations can be made, and that such modifications and variations are intended to fall within the scope of the appended claims.

What is claimed is:

1. A tool-belt tool tote device comprising:

a clip including a front face and a rear face, said front face terminating *in* a connecting end having a first aperture disposed therein;

a swivel element including a first end having a second aperture disposed therein corresponding in size to said first aperture and a second end having a top surface, a bottom surface and a third aperture;

a hook element having an externally threaded first end and a distal second end;

a first fastening means to securely and swivelably attach said swivel element to said clip in such a manner that said swivel element is capable of freely swivelling 360°; and a second fastening means to rotatably attach said hook element to said swivel element in such a manner that said hook element is capable of being rotated 360°.

2. The tool belt tote device in accordance with claim 1, wherein said first fastening means comprises a semi-tubular rivet introduced through said first and second apertures.

3. The tool belt in accordance with claim 1, wherein said second fastening means comprises an acorn nut and a jam nut, each capable of engaging said externally threaded first end of said hook element.

4. The tool belt tote device in accordance with claim 3, wherein said hook element is rotatably attached to said swivel element by threadedly engaging said jam nut to said first end of said hook element, introducing said first end of said hook element into said third aperture of said swivel element such that said first end extends through said top surface of said swivel element and is retained through said top surface by said acorn nut.

5. The tool belt tool tote in accordance with claim 4, wherein said second fastening means further comprises an O-ring disposed between said jam nut and said swivel element and an O-ring disposed between said acorn nut and said swivel element.

6. The tool belt tote device in accordance with claim 1, wherein said second distal end of said hook element is externally threaded and further comprising capping means having an internally threaded recess which is capable of engaging said distal second end.

7. The tool belt tote device in accordance with claim 1, wherein said second distal end of said hook element is knurled and further comprising capping means having an internal recess which is capable of engaging said knurled second end.

8. The tool belt tool tote in accordance with claim 1, wherein said hook element is fabricated from hard or soft metals, metal alloys, hard plastics, flexible plastics or combinations thereof.

9. The tool belt tool tote in accordance with claim 1, wherein said clip is fabricated from hard or soft metals or metal alloys, hard plastics, flexible plastics or combinations thereof.

*10. A tool-belt tool tote device comprising:*

*a clip including a front face and a rear face, said front face terminating into a connecting end having a first aperture disposed therein;*

*a swivel element including a first end having a second aperture disposed therein corresponding in size to said first aperture and a second end having a top surface, a bottom surface and a third aperture;*

*a hook element having a first end and a distal second end;*

*a first fastening means in the form of a rivet to securely and swivelably attach said swivel element to said clip in such a manner that said swivel element freely swivels on said rivet; and*

*a second fastening means to rotatably attach said hook element to said swivel element in such a manner that said hook element is capable of being rotated at least about 180°.*

*11. The tool-belt tool tote device in accordance with claim 10, wherein said first end of said hook element is externally threaded.*

*12. The tool belt tote device in accordance with claim 11, wherein said second fastening means is internally threaded and wherein said hook element is rotatably attached to said swivel element by threadedly engaging said hook element to said second fastening means.*

*13. The tool-belt tool tote device in accordance with claim 10, wherein each of said hook element and said clip is fabricated from hard or soft metals, metal alloys, hard plastics, flexible plastics or combinations thereof.*

*14. A tool-belt tool tote device comprising:*

*a clip including a front face and a rear face, said front face terminating into a connecting end having a first aperture disposed therein;*

*a swivel element including a first end having a second aperture disposed therein corresponding in size to said first aperture and a second end having a top surface, a bottom surface and a third aperture;*

*a hook element having a first end and a distal second end;*

*a first fastening means in the form of a rivet which extends through said first aperture and said second aperture, said first fastening means being adapted to securely and swivelably attach said swivel element to said clip in such a manner that said swivel element freely swivels on said rivet, and*

*a second fastening means being adapted to rotatably attach said hook element to said swivel element in such a manner that said hook element is capable of being rotated at least about 180°.*

*15. The tool-belt tool tote device in accordance with claim 14, wherein each of said hook element and said clip is fabricated from hard or soft metals, metal alloys, hard plastics, flexible plastics or combinations thereof.*

*16. A tool-belt tool tote device comprising:*

*a clip including a front face and a rear face, said front face terminating into a connecting end having a first aperture disposed therein;*

*a swivel element including a first end having a second aperture disposed therein corresponding in size to said first aperture and a second end having a top surface, a bottom surface and a third aperture;*

*a hook element having a first end and a distal second end, said hook element being adapted to carry a tool;*

*a first fastening means in the form of a rivet which extends through said first aperture and said second aperture, said first fastening means being adapted to securely and swivelably attach said swivel element to said clip in such a manner that said swivel element freely swivels on said rivet, and*

*a second fastening means being adapted to rotatably attach said hook element to said swivel element in such a manner that said hook element is capable of being rotated at least about 180°,*

*wherein, when said hook element carries a tool and said tool belt tool tote device is in use, said swivel element is configured to freely swivel on said rivet.*

*17. The tool-belt tool tote device in accordance with claim 16, wherein each of said hook element and said clip is fabricated from hard or soft metals, metal alloys, hard plastics, flexible plastics or combinations thereof.*

* * * * *